United States Patent [19]

Bowers, Jr.

[11] 3,714,407
[45] Jan. 30, 1973

[54] PHOTOFLASH LAMP ARRANGEMENT HAVING THERMALLY ACTUATED CONTROL

[75] Inventor: Harry J. Bowers, Jr., Mayfield Heights, Ohio

[73] Assignee: General Electric Company

[22] Filed: March 15, 1971

[21] Appl. No.: 124,379

[52] U.S. Cl..........................240/1.3, 95/11 L, 431/95
[51] Int. Cl................................................G03b 15/03
[58] Field of Search.....240/1.3; 95/11 L; 431/93, 95, 431/13

[56] References Cited

UNITED STATES PATENTS

| | | | |
|---|---|---|---|
| 3,544,251 | 12/1970 | Brandt | 240/1.3 X |
| 3,443,875 | 5/1969 | Herrmann | 240/1.3 X |
| 3,458,270 | 7/1969 | Ganser et al. | 240/1.3 X |
| 3,459,487 | 8/1969 | Glenn | 240/1.3 X |
| 3,562,508 | 2/1971 | Hoffacker | 240/1.3 |

Primary Examiner—Louis J. Capozi
Assistant Examiner—Joseph W. Roskos
Attorney—Norman C. Fulmer, Henry P. Truesdell, Frank L. Neuhauser, Oscar B. Waddell and Joseph B. Forman

[57] ABSTRACT

In an arrangement of photoflash lamps, one or more of the lamps has a heat-deformable plastic control pin positioned adjacent thereto so as to become deformable due to heat generated when the lamp is flashed. The control pins are provided with specially shaped deformation zones, blackened if desired, to more readily absorb heat and become deformed when the associated lamp is flashed. The control pins are spring-loaded by a mechanism for controlling a function such as switching of electrical connections from one lamp to another as they become flashed, or for actuating indicator means for indicating whether a lamp has been flashed.

14 Claims, 15 Drawing Figures

PATENTED JAN 30 1973
3,714,407
SHEET 1 OF 2
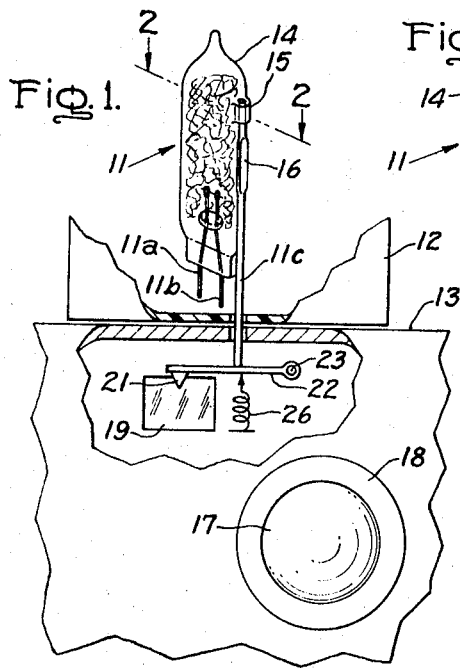
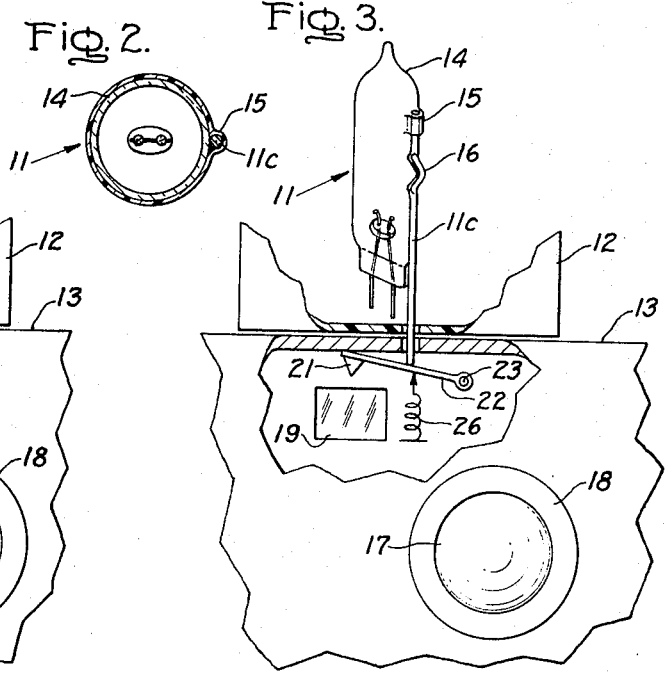
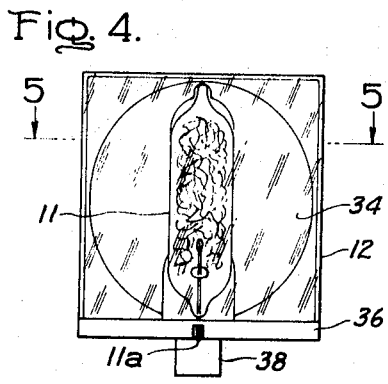
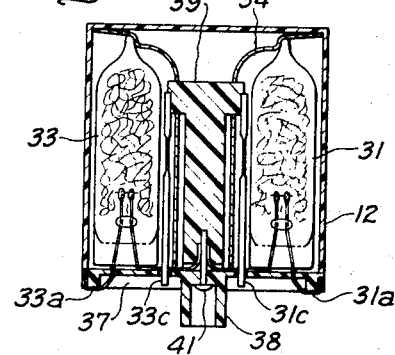
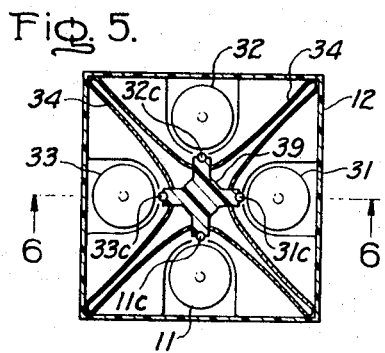
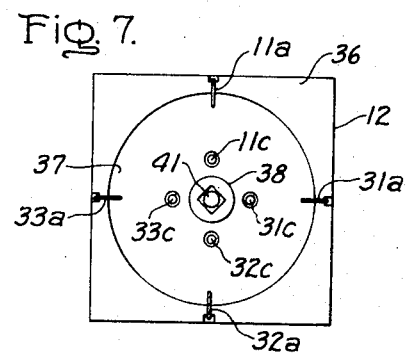
Inventor:
Harry J. Bowers, Jr.
by Norman C. Fulmer
His Attorney

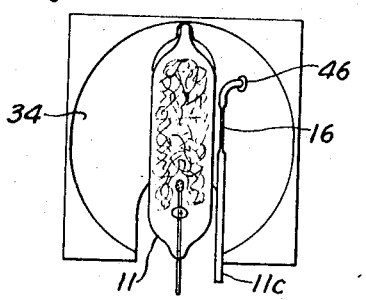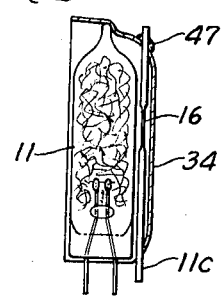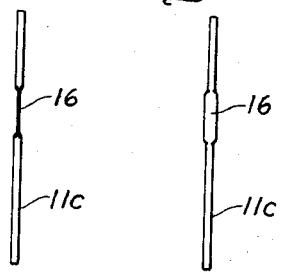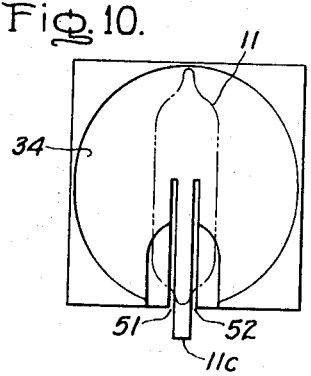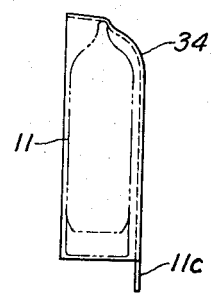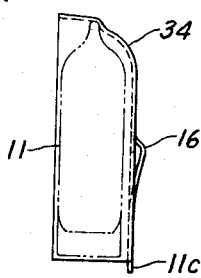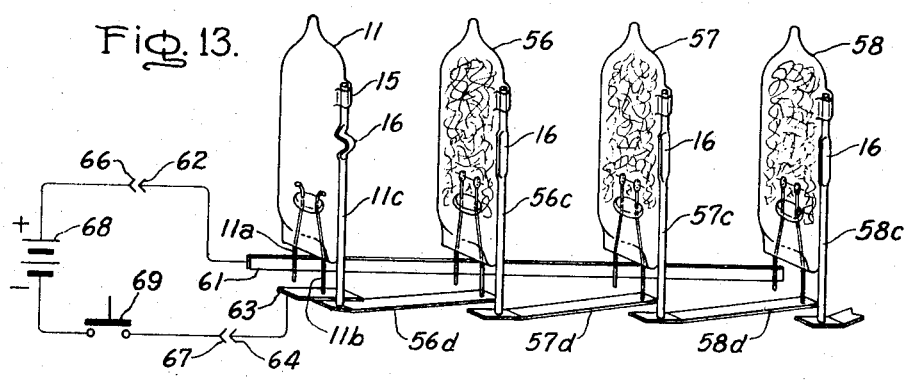

3,714,407

PHOTOFLASH LAMP ARRANGEMENT HAVING THERMALLY ACTUATED CONTROL

CROSS-REFERENCES TO RELATED APPLICATIONS

Patent application, Ser. No. 95,291, filed Dec. 4, 1970, of Harry J. Bowers, entitled "Photoflash Lamp Array with Automatic Switching," assigned to the same assignee as the present invention.

Patent application, Ser. No. 95,102, filed Dec. 4, 1970, of Kurt H. Weber, entitled "Flash Indicator for Photoflash Lamps," assigned to the same assignee as the present invention.

BACKGROUND OF THE INVENTION

The invention is in the field of flash photography utilizing photoflash lamps, and is particularly directed to heat-responsive arrangements, responsive to heat from a flashing lamp, which actuate control mechanisms such as for switching electrical connections to successive lamps or for indicating whether a lamp has been flashed.

Numerous ways have been devised for sequentially flashing the lamps of an assembly of photoflash lamps, for causing one lamp to be flashed in synchronism with the opening of a camera shutter each time it is desired to take a flash picture. The well-known flashcube is mechanically rotated to bring an unflashed lamp into operating position and to make electrical or other actuating connections to it. Another arrangement that has been proposed employs an array of flash lamps all arranged to emit light in the same direction, and they are flashed, one-at-a-time each time a flash picture is taken, by means of mechanically actuated electrical switching, or electronic circuitry, or by heat-activated or light-activated means which responds to the flashing of a lamp by switching the next lamp into the circuit so as to be flashed when the next flash picture is taken.

When the lamps of an assembly of flash lamps are sequentially flashed, as described above, a flashed lamp indicator is desirable, such as a "flag" or other indication in the camera viewfinder, to reduce the frustrating possibility of attempting to take an additional flash picture after all of the flash lamps of the flashcube or other type of array have been flashed. Such flash indication has been achieved by mechanical means and also be electrical means.

The above-referenced Bowers patent application is primarily directed to an arrangement for sequentially flashing different individual flash lamps of a flash lamp array, in which each lamp has a switch control pin adhered thereto by means of heat-responsive material which softens due to heat generated by the lamp when flashing, thereby permitting the switch control pin to become movable and permit closure of electrical contacts for connecting into the circuit the next lamp that is to be flashed.

The above-referenced Weber patent application is primarily directed to an arrangement for indicating whether or not a flash lamp has been flashed, in which a flash lamp has an indicator control pin adhered thereto by means of heat-responsive material which softens due to heat generated by the lamp when flashing, thereby permitting the indicator control pin to become movable and permit actuation of a flash indicator mechanism for indicating in a camera viewfinder that the lamp has been flashed.

SUMMARY OF THE INVENTION

Objects of the invention are to provide a new and improved control-pin arrangement for use with photoflash lamps, and to provide such an arrangement which is economical to manufacture and reliable in operation.

The invention comprises, briefly and in a preferred embodiment, an arrangement of photoflash lamps including means associated with at least one of the lamps for positioning a heat-deformable control rod or pin adjacent thereto. The control pin, preferably of plastic, softens and becomes deformable from heat generated when the lamp is flashed. The control pins preferably are provided with shaped deformation zones, such as a narrowed cross-section zone or a flattened and widened zone facing broadside toward the lamp, and blackened, so as to more readily absorb heat from the lamp and readily become deformable when the lamp is flashed. Each control pin preferably is held at an end thereof by attachment to the lamp or by other means such as a reflector or support post, the other end of the control pin being engaged by a spring-biased control mechanism for causing the aforementioned deformation of the control pin when the lamp flashes and simultaneously controlling a function such as electrically switching an unflashed lamp into the flash circuit or actuating a flash indicator means for indicating that the lamp has been flashed.

BRIEF DESCRIPTION OF THE DRAWING

FIG. 1 is a front view of a camera and a flash lamp assembly, partly shown in perspective form, illustrating the basic concepts of the invention;

FIG. 2 is a cross-sectional view taken on the line 2—2 of FIG. 1;

FIG. 3 is a view similar to that of FIG. 1, showing the arrangement of parts after the flash lamp has been flashed;

FIG. 4 is a front view of a flashcube in which each of the four flash lamps thereof is provided with a flash indicator pin positioned adjacent thereto in accordance with the invention;

FIG. 5 is a cross-sectional view taken on the line 5—5 of FIG. 4;

FIG. 6 is a cross-sectional view taken on the line 6—6 of FIG. 5;

FIG. 7 is a bottom view of the flashcube of FIG. 4;

FIG. 8 is a front view of a flash lamp and reflector assembly for positioning a control pin in accordance with an embodiment of the invention;

FIG. 9 is a side sectional view of a flash lamp and reflector assembly for positioning a control pin in accordance with another embodiment of the invention;

FIG. 10 is a front view of a flash lamp and reflector having an integrally formed control pin in accordance with an embodiment of the invention;

FIG. 11 is a side view of the arrangement of FIG. 10;

FIG. 12 is a view similar to that of FIG. 11, showing the arrangement of the integrally formed control pin after the flash lamp has been flashed; and FIG. 13 is a perspective view of the essential elements of the invention in accordance with an embodiment thereof for sequentially switching electrical connections to successive flash lamps, shown in the condition where the first lamp has been flashed and the second lamp has been connected so as to be flashed when the next picture is taken.

DESCRIPTION OF THE PREFERRED EMBODIMENT

In the basic arrangement of the invention as shown in FIG. 1, a photoflash lamp 11 is carried in a housing 12 adapted to be attached to a camera 13. The flash lamp 11 is provided with a pair of filament or igniter lead wires 11a and 11b adapted to be connected to a source of firing pulses for flashing the lamp. The lamp 11 may be a conventional photoflash lamp, such as or similar to General Electric type AG–1 photoflash lamp, which is coated with a protective lacquer 14 to prevent fracturing or dissociation of the glass envelope in case the envelope should crack due to heat when the lamp is flashed. In accordance with the invention, a heat-deformable control pin 11c is positioned adjacent to and extends alongside the lamp 11, such as by means of the normal lacquer coating 14 which adheres the control pin 11c at the upper end thereof to the lamp 11, as indicated at 15. Alternatively, other suitable adhesive material may be employed for attaching the control pin to the lamp. Although it is of no consequence, for purposes of the invention, if the lacquer 14 or other material employed to adhere the control pin 11c to the lamp 11 becomes soft and deformable due to heat when the lamp is flashed, in accordance with the invention the lacquer 14 or other material for adhering the control pin to the lamp may be a relatively higher temperature type of material which does not become soft and yieldable due to heat from the lamp flashing.

The control pin 11c is made of a material which becomes soft and longitudinally deformable when heated by heat generated when the lamp 11 is flashed. A suitable heat-deformable material for the control pin 11c is a thermoplastic such as acetate butyrate or, more preferably, General Electric Noryl thermoplastic because of its relatively great cold strength and sharp melting point. To facilitate deformation of the control pin 11c due to heat generated when a lamp 11 is flashed, it is provided with a specially shaped deformation zone 16 which may be of narrowed cross-section, or, as shown in the drawing, may comprise a narrowed and widened region arranged broadside toward the lamp 11 so as to readily receive heat from the lamp 11. The side of the deformable zone 16 facing toward the lamp 11 may be blackened such as by paint or carbon, to facilitate its absorption of heat for causing quick and reliable softening and deformation of the control pin 11c. The deformable zone 16 is located at approximately half-way of the height of the lamp bulb, where the heat is the most intense when the lamp is flashed.

The housing 12 may contain an array of a plurality of the photoflash lamps 11, arranged to be flashed in sequence for taking a plurality of flash pictures by means of firing voltage pulses generated in synchronism with opening of the camera shutter. The control pin 11c, when it becomes heated and deformable upon flashing of the lamp 11, causes actuation of a control function such as electrical switching among lamps as will be described with reference to FIG. 13, or for actuating a flash indicator mechanism as will now be described with reference to FIGS. 1 and 3.

The flash array housing 12 and camera 13 are provided with aligned openings through which the control pin 11c extends into the camera for actuating the flash indicator mechanism. The camera 13 is provided with the usual lens 17 and a shutter 18 which may be the well-known between-the-lens type, or may be the well-known focal plane type of shutter, provided with synchronized means for initiating a firing pulse for flashing a flash lamp. The source of firing pulse energy may be a battery, piezoelectric device, or other suitable means. Also, a percussion ignition mechanism may be employed. The camera 13 also is provided with a viewfinder 19, which may be of any conventional type such as a direct viewfinder, or the pentaprism viewfinder of a reflex camera. The camera 13 is provided with a flash indicator "flag" 21 attached at the end of a flash indicator arm 22 which is pivoted at its other end 23 with respect to the camera 13 so that the indicator arm 22 may swing vertically about the pivot 23, and thus the indicator flag 21 may be either visible in the viewfinder 19, or non-visible when swung out of view due to an upward urging by a compression spring 26.

When the flash array 12 is plugged into or otherwise attached to the camera 13, the flash indicator pin 11c presses the flash indicator arm 22 downwardly so that the flash indicator flag 21 is visible in the viewfinder 19, thus indicating to the user that the flash lamp 11 is in position and has not yet been flashed. When the lamp 11 is flashed, its indicator pin 11c becomes deformable at the zone 16, due to softening from heat generated when the lamp 11 flashes, whereupon the spring 26 is permitted to swing the flash indicator arm 22 upwardly, thus deforming the control pin 11c as shown at 16 in FIG. 3, whereupon the flash indicator flag 21 disappears from view thus indicating that the lamp 11 has been flashed. Also, it will be noted, non-visibility of the flash indicator flag 21 in the viewfinder 19 indicates the absence of a flash array 12 attached to the camera 13, and also indicates non-flashability of the lamp 11 if the array 12 should be reattached to the camera 13 after the lamp 11 has already been flashed. Alternatively, the mechanism can be arranged so that a visible flag 21 indicates absence of a flashable lamp. Other flash indicator means may be employed instead of the flag 21, such as means for moving a small mirror or prism for reflecting or refracting a suitable flash indicator signal or symbol into or out of view in the view-finder 19.

In the flashcube embodiment of the invention illustrated in FIGS. 4 through 7, each of the four flash lamps of the flashcube is provided with an individual flash indicator pin, so as to provide a flash indication in the camera viewfinder when each successive lamp is flashed. This is particularly useful whenever, after the four flash lamps have been flashed, the flashcube is rotated on the camera to bring the first-flashed lamp again into position for taking a fifth picture with the four-lamp flashcube; the flash indicator will indicate that this lamp has already been flashed, and thus save the user the frustrating attempt of obtaining a fifth flash from a four-flash flashcube. A suitable camera mechanism for use with such a flashcube is described in the above-referenced Weber patent application. In the embodiment of FIGS. 4–7, four flash lamps 11, 31, 32 and 33 are contained in the housing 12. Individual reflectors 39 are respectively provided for the four lamps. The base 36 of the housing 12 is provided with a circular recess 37 at the bottom thereof, and an attachment post 38 extends downwardly from the center of the recessed base 36. Each of the four flash lamps is provided with an individual flash indicator pin $c$, all of which extend downwardly through suitable openings in the base 36 and into the recessed portion 37 thereof. In this embodiment, the indicator pins $c$ are not attached to the respective flash lamps, but instead are supported at the upper ends thereof by means of a centrally located support post 39 which positions the indicator pins so that they extend alongside and adjacent to the respective flash lamps, as shown, the heat-deformable zones 16 of the indicator pins being oriented broadside toward the respective flash lamps as has been described above. Thus, the lower ends of the indicator pins are sufficiently exposed for coacting with the camera flash indicator, while at the same time they are protected from accidental damage due to their being in the recess 37 and also by their close adjacency to the attachment post 38.

The $a$ filament lead wires of the respective lamps extend through suitable openings in the base 36 and are bent under the outer periphery of the base 36 and hence upwardly into slots, so that the portions of the $a$ lead wires at the bottom of the base 36 are exposed for making electrical contact with a camera contactor. The "b" lead wires of the lamps are all electrically attached to a common central contact 41 carried by the base 36 in a recess of the connector post 38. The connector post 38 is adapted to be engaged by a flashcube rotating member in a camera, as is described in the above-referenced Weber patent application.

As each of the flash lamps 11, 31, 32 and 33 becomes flashed, the adjacent indicator pin becomes deformable as has been described above, thus actuating the flash indicator mechanism in the camera. By supporting the indicator pins by means of a support post 39, rather than by attachment to the flash lamps, the entire assembly can be manufactured prior to inserting the flash lamps therein.

The control pins 11 may be carried by the reflector 34, if desired, as shown in FIGS. 8 and 9. In FIG. 8, the upper end of the control pin 11c is bent over substantially laterally and fits into an opening in the reflector 34 and is cemented or otherwise attached thereto, as indicated by the numeral 46, so that the deformable zone 16 of the control pin 11c is adjacent to the lamp 11. In the embodiment of FIG. 9, the upper end of the straight control pin 11c extends through an opening in the reflector 34 and is cemented or otherwise attached thereto, as indicated by the numeral 47, whereby the deformable zone 16 is adjacent to the lamp 11.

In the embodiment of the invention shown in FIGS. 10-12, the control pin 11c is formed integrally with the reflector 34, by means of a pair of slots 51 and 52. FIGS. 10 and 11 are front and side views, respectively, of the arrangement, and FIG. 12 is a side view after the lamp 11 has been flashed, showing the deformation of the control pin 11c at the deformation zone 16 which is located near the hottest part of the lamp 11 when flashed. In this embodiment, the reflector 34 must be made from a suitable thermoplastic material which softens at the temperature produced by the flashing of the lamp 11. If desired, the integral control pin 11c may be narrowed down at the deformation region 16, and may be blackened, to facilitate its deformation while at the same time insuring suitable rigidity of the control pin 11c. Although the foregoing embodiments are described with reference to a single flash lamp 11 and a single associated control pin 11c, the principles can be applied to a plurality of flash lamps in a flash lamp array.

In the sequential lamp switching arrangement shown in FIG. 13, a plurality of flash lamps 11, 56, 57 and 58 are positioned in a liner arrangement, and are adapted to have individual reflectors (not shown) positioned behind each lamp for directing the light in the same given direction, as disclosed more fully in the above-referenced Bowers patent application. An individual switch control pin $c$ is positioned adjacent to each lamp, and may be held in place with respect to the lamp by attachment to the lamp as indicated by numeral 15, or by other suitable support means such as those shown in the various figures of the drawing. Each switch control pin is provided with a deformable zone 16, as has been described above, located where it will receive adequate heat from the flashing lamp for causing or permitting deformation of the deformation zone 16. The lower ends of the switch control pins preferably extend below the bulb of the flash lamp, as shown. The $a$ lead wires of the flash lamps are connected to a common electrical conductor 61 which is electrically connected to a connector prong 62 of the photoflash array. The lead wire 11b of the first flash lamp 11 is connected to an electrically conductive tab 63, which is connected to a connector prong 64 of the array of flash lamps. The connector prongs 62 and 64 are respectively adapted to engage electrical socket contacts 66 and 67 which are contained in a camera or a flash attachment adapted to receive the photoflash lamp array. The socket contacts 66 and 67 are connected to a source of electrical flash lamp firing pulses which are produced in synchronism with the opening of a camera shutter. One way of producing the firing pulses, as shown in FIG. 13, is by means of a battery 68 or other power source, and a normally open switch 69 adapted to become closed momentarily in synchronism with the opening of a camera shutter, thereby producing a suitable firing pulse.

A plurality of resilient conductor strips $d$ are respectively connected to the lead wires $b$ of all but the first lamp 11, the free ends thereof being urged towards electrical contact with the lead wire connection of the preceding lamp, but held in spaced-apart relationship thereto by means of the free end of the switch pin $c$ of the preceding lamp when the photoflash array is in its initial unused condition. For example, as shown in FIG. 13, the first flash lamp 11 has been flashed, in response to a firing pulse generated by momentary closure of the switch 69 in synchronism with the opening of a camera shutter, this firing pulse having been fed directly to the first lamp 11 via the conductors 61 and 63. Upon flashing of the first lamp 11, the heat therefrom has sufficiently softened the deformable zone 16 of the switch control pin 11c, so that the resilient contact 56d has pushed the lower portion of the switch pin upwardly, causing deformation of the zone 16, and permitting the free end of the resilient strip 56d to come into contact with the conductor tab 63, thereby placing the second lamp 56 directly into the circuit so that it will be flashed by the next occurring firing pulse. Similarly, when the second lamp 56 is flashed by a firing pulse, deformation of the control switch pin 56c will permit the resilient contactor 57d to make electrical contact with the preceding contactor 56d, whereby the third lamp 56 will become connected to receive the next occurring firing pulse. The foregoing sequence repeats until all of the lamps have been flashed. Each firing pulse is of short duration so as to be mostly dissipated in the lamp being flashed, whereby a single lamp is flashed per firing pulse. The last lamp of the array need not be provided with a switch control pin, but if desired may be provided with a control pin for actuating a last-flash indicator means, for example of the type illustrated in FIGS. 1 and 3 of the drawing.

FIGS. 14 and 15 show side and front views, respectively, of a preferred control pin construction in accordance with the invention, in which the deformation zone 16 has been flattened such as by means of jaws temporarily squeezing against the control pin, which jaws may be heated if desired to facilitate the shaping of the deformation zone 16.

While preferred embodiments of the invention, and modifications thereof, have been shown and described, other embodiments and modifications thereof will become apparent to persons skilled in the art, and will fall within the scope of invention as defined in the following claims.

What I claim as new and desire to secure by Letters Patent of the United States is:

1. A photoflash arrangement comprising a photoflash lamp and a heat-deformable control pin, means supporting said control pin at an end thereof whereby at least a portion of the control pin is adjacent to and extends alongside said lamp, said control pin being made of a material that softens and becomes longitudinally deformable when heated from heat generated by the flashing of said photoflash lamp.

2. An arrangement as claimed in claim 1, in which said control pin is provided with a deformation zone intermediate the ends thereof, said deformation zone being blackened so as to more readily absorb heat from said lamp when flashed thereby permitting deformation of said control pin at said deformation zone.

3. An arrangement as claimed in claim 1, in which said control pin is provided with a deformation zone intermediate the ends thereof comprising a narrowed cross-section of the control pin at a position to receive heat from said lamp when flashed.

4. An arrangement as claimed in claim 1, in which said control pin is provided with a deformation zone intermediate the ends thereof comprising a flattened and widened section thereof facing broadside toward said lamp at a position to receive heat from said lamp when flashed.

5. An arrangement as claimed in claim 4, in which said deformation zone is blackened on the side thereof facing toward said lamp.

6. An arrangement as claimed in claim 1, in which said support means comprises means attaching said control pin at an end thereof to said lamp.

7. An arrangement as claimed in claim 1, including housing means containing said lamp and control pin, and in which said support means comprises means carried by said housing means for supporting said control pin near an end thereof.

8. An arrangement as claimed in claim 1, including a reflector positioned with respect to said lamp for reflecting light therefrom, and in which said support means comprises means attaching said control pin at an end thereof to said reflector.

9. An arrangement as claimed in claim 1, including a reflector positioned with respect to said lamp for reflecting light therefrom, said control pin being integrally formed with said reflector.

10. An arrangement as claimed in claim 9, in which said reflector is contoured to have a portion thereof relatively straight and adjacent to said lamp alongside thereof, said reflector being provided with a pair of mutually parallel slots extending into said portion of the reflector and defining said control pin therebetween.

11. A photoflash arrangement comprising a plurality of elongated photoflash lamps positioned with their axes mutually parallel to one another, a plurality of heat-deformable control pins each supported at an end thereof and respectively positioned adjacent to and alongside individual ones of said lamps, the axes of said control pins being mutually parallel to each other and to said axes of the lamps, each of said control pins being made of a material that softens and becomes longitudinally deformable when heated from heat generated when the individual adjacent lamp is flashed, the remaining end of each control pin being adapted to become movable when the control pin becomes deformable.

12. An arrangement as claimed in claim 11, in which each said control pin is provided with a deformation zone intermediate the ends thereof at a position to receive heat from the individual adjacent lamp when flashed thereby permitting deformation of the control pin at said deformation zone.

13. An arrangement as claimed in claim 12, in which each of said deformation zones is shaped to have a substantially flat surface facing toward said individual adjacent lamp.

14. An arrangement as claimed in claim 13, in which each of said flat surfaces of the deformation zones is blackened so as to more readily absorb heat from the individual adjacent lamp when flashed.

* * * * *